Nov. 11, 1952 — C. T. McELROY ET AL — 2,617,223

MACHINE FOR TREATING WOOD SURFACES

Filed Aug. 16, 1948 — 4 Sheets-Sheet 1

INVENTORS
CLIFFORD T. McELROY
JOHN G. DAVIDSON
BY
ATTORNEY

Nov. 11, 1952     C. T. McELROY ET AL     2,617,223
MACHINE FOR TREATING WOOD SURFACES
Filed Aug. 16, 1948     4 Sheets-Sheet 2
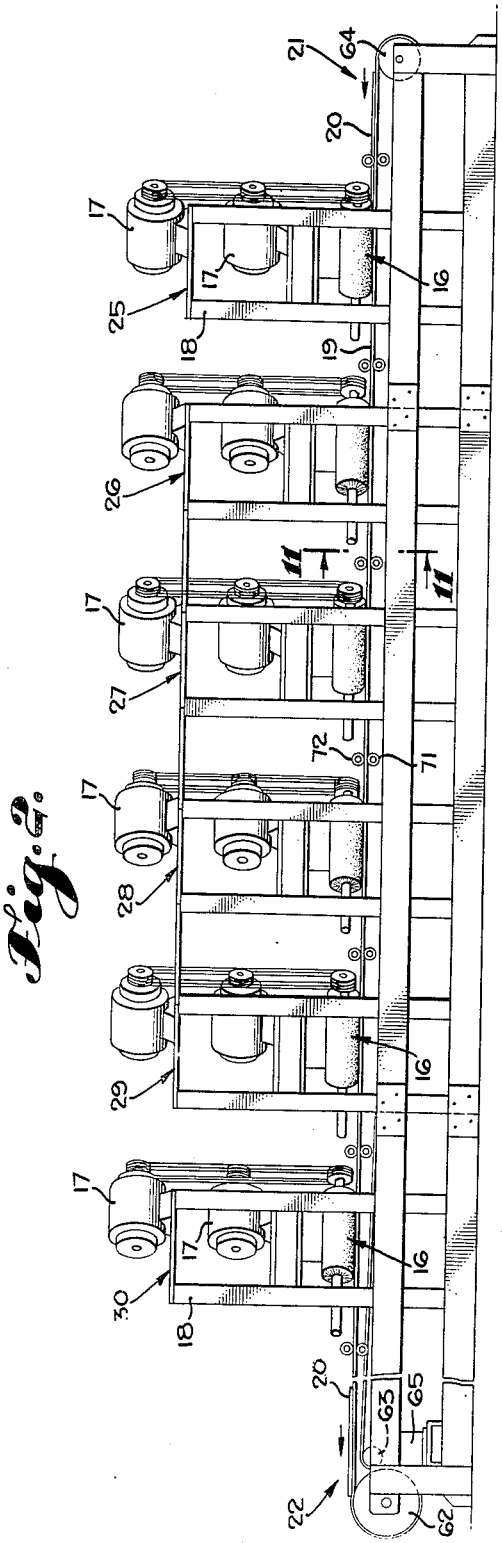
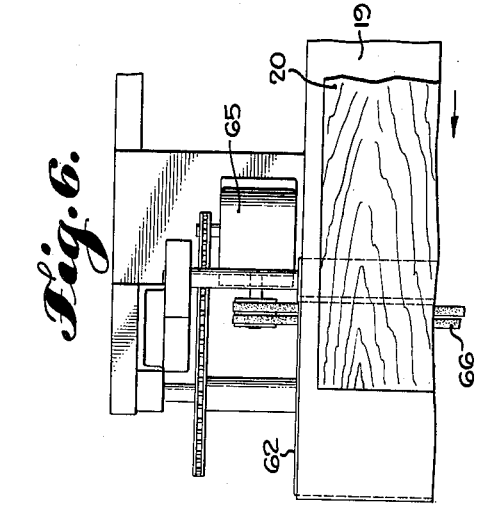
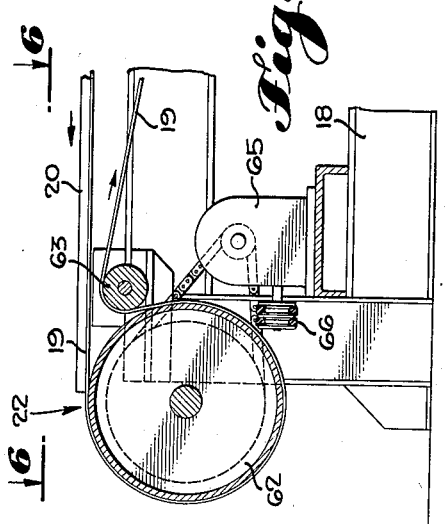
INVENTORS
CLIFFORD T. McELROY
JOHN G. DAVIDSON
BY
ATTORNEY Nov. 11, 1952          C. T. McELROY ET AL          2,617,223
MACHINE FOR TREATING WOOD SURFACES
Filed Aug. 16, 1948          4 Sheets-Sheet 3
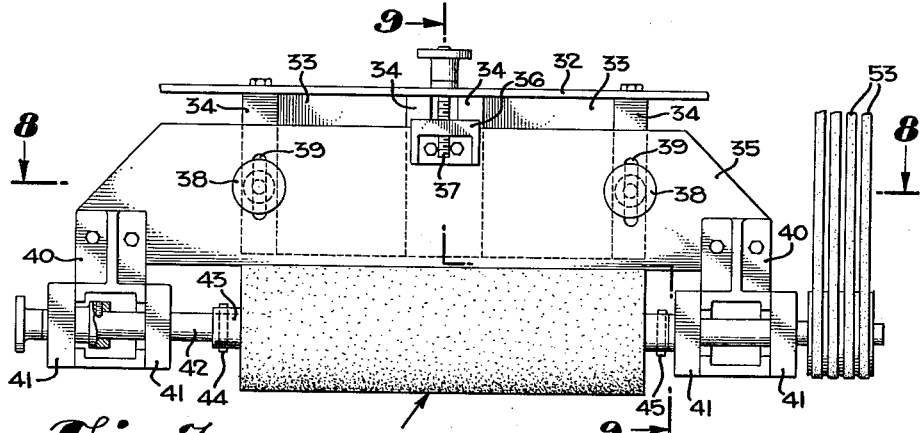
*Fig. 7.*
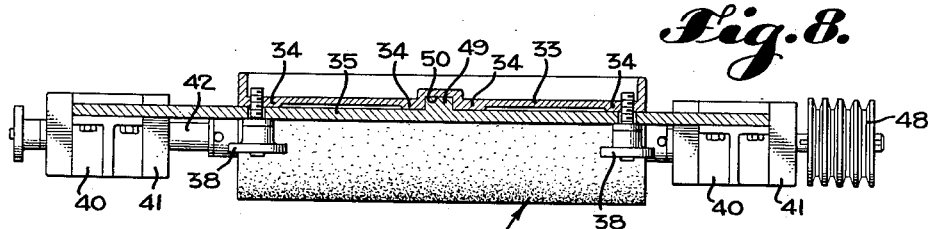
*Fig. 8.*
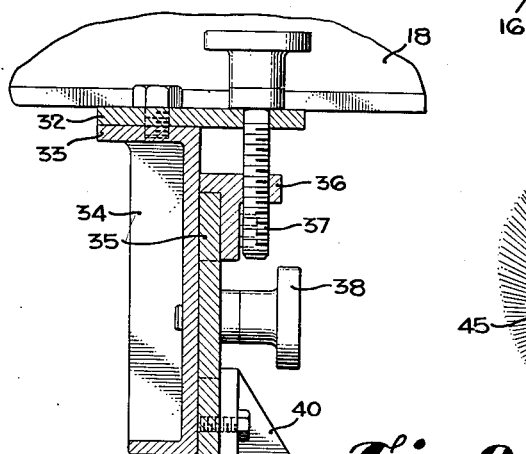
*Fig. 9.*
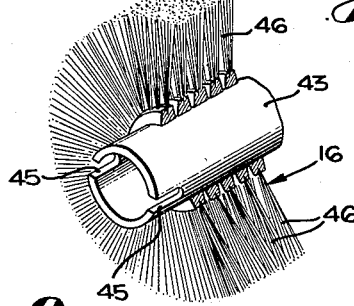
*Fig. 10.*
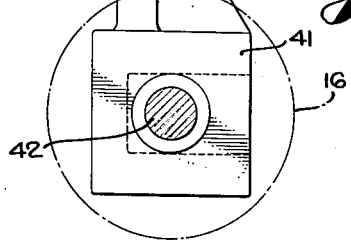
INVENTORS
CLIFFORD T. McELROY
JOHN G. DAVIDSON
BY
ATTORNEY INVENTORS
CLIFFORD T. McELROY
JOHN G. DAVIDSON
BY
ATTORNEY Patented Nov. 11, 1952

2,617,223

UNITED STATES PATENT OFFICE 2,617,223

MACHINE FOR TREATING WOOD SURFACES

Clifford T. McElroy, Temple City, and John G. Davidson, Pasadena, Calif., assignors to Davidson Plywood and Lumber Co., Los Angeles, Calif., a corporation of California Application August 16, 1948, Serial No. 44,434

11 Claims. (Cl. 41—1)

This invention relates to machines for treating wood surfaces, and more particularly relates to machines for developing the grain of wood surfaces by elimination of the softer fibers while retaining the harder parts of the wood in outstanding relief from the general surface.

The invention has particular applicability in the treatment of plywood surfaces, although its use is not confined to such stratified or composite materials. However, plywood panels are usually of large dimensions, a conventional size being four feet wide by eight feet long, and the plies composing such panels are cut circumferentially from a log by a rotary cutting process which exposes the grain or pattern of fiber density in a very noticeable manner over the whole surface. Having material of such natural beauty to work with has presented a challenge to manufacturers of building material to enhance the work of nature and the results of skilled workmanship by producing still more beautiful and contrasting surfaces. Tinting the surfaces has been used to some extent, the pigments penetrating and lodging in the soft and hard sections of the grain to different extents and thereby emphasizing the grain pattern. Scorching the surface and removing the more easily removed scorched fibers has also been utilized as a process, but both of these processes change the natural color of the wood which is not always desirable.

It has been found that attractive effects can be obtained by simply removing the soft wood fibers and leaving the hard wood fibers outstanding in low relief, as this produces lights and shadows and an interesting three-dimensional appearance. For this purpose both sand blasting processes and brushing processes have been used, but the sand blasting is frequently uneven in its application and leaves the wood surface in a not entirely satisfactory condition for further working, and the brushing processes hitherto used have been inadequate in that they left a considerable quantity of soft wood in the corners and angles of the hard wood relief and failed to attain a "sharp" effect. The processes referred to have also been expensive, not only from the aspect of time required to achieve a reasonably satisfactory result, but from the aspect of wear and waste of the abrading materials.

It is an object of this invention to provide a machine for treating wood surfaces by a brushing process which will effectively remove the soft surface fibers and leave the hard fibers outstanding in sharp relief.

Another object of the invention is to provide a machine for the above-stated purpose which will cut into the soft surface fibers which are normally protected by the angles and corners formed by the harder fibers and so leave the wood surface more thoroughly scoured of soft material.

A further object of the invention is to provide a machine for treating wood surfaces which not only will scour the softer fibers, but will burnish and polish the harder fibers which remain in relief following the treatment.

Yet another object of the invention is to provide a machine for treating wood surfaces by a scouring and brushing process which is rapid in its action and is adapted for use in a manner extending the life of the brushes beyond the normal.

A still further object of the present invention is to provide apparatus well suited for performing the method forming the subject matter of our co-pending application, Serial No. 48,468, filed September 9, 1948.

The invention possess other objects and features of advantage, some of which, with the foregoing, will be set forth in the following description of the preferred forms of our invention which are illustrated in the drawings accompanying and forming part of the specification. It is to be understood that we do not limit ourselves to the showing made by the said drawings and description, as we may adopt variations of the preferred forms within the scope of the invention as set forth in the claims.

Referring to the drawings:

Figure 2 is a side elevational view of the machine, as viewed from the right of Figure 1, sundry bearing and support members shown in detail in other figures being herein omitted for clarity of illustration.

Figure 3 is a fragmentary sectional view on an enlarged scale showing one of the motor groupings employed to operate a transverse group of brushes, the direction of view and line of section being indicated by the line 3—3 of Figure 1.

Figure 6 is a top plan view of the conveyor drive, as viewed on the line 6—6 of Figure 5.

Figure 7 is a view of an individual brush and the mounting therefor, showing the means of rotatably and adjustably supporting the brush and for driving the brush.

Figure 8 is a horizontal sectional view of the brush mounting, the plane of section being indicated by the line 8—8 of Figure 7, with the direction of view as indicated.

Figure 9 is a vertical sectional view on an enlarged scale of a brush and its mounting, the plane of section being indicated by the line 9—9 of Figure 7, with the direction of view as indicated.

Figure 10 is a still further enlarged fragmentary view of one of the brushes, part of the brush being shown cut away to illustrate the mounting of the bristles.

Figure 1:
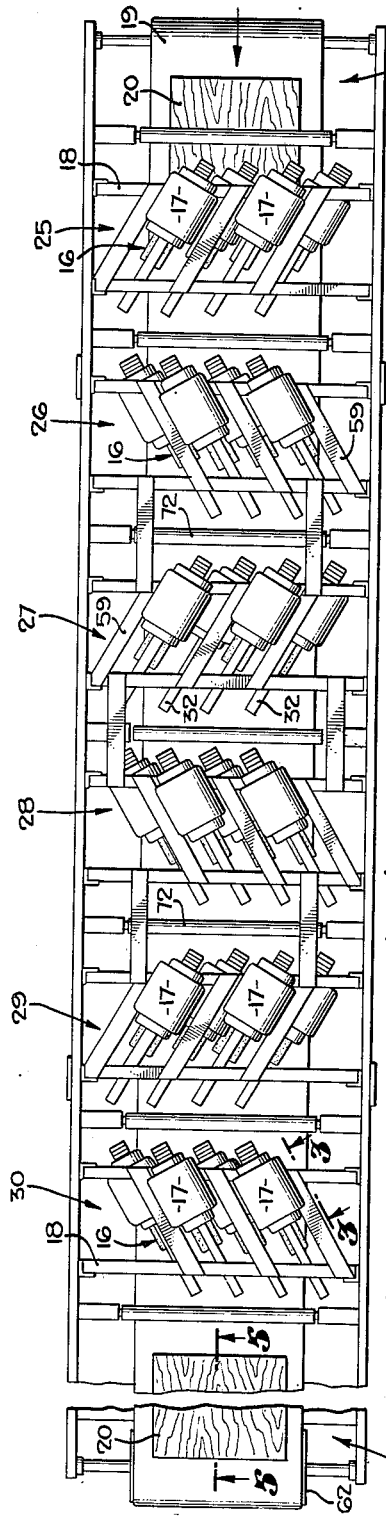
Figure 1 is a top plan view of a wood surface treating machine embodying the principles of our invention, and showing the motors and brushes arranged in their transverse groupings.

Specifically describing a preferred embodiment of our invention, our wood surface treating machine comprises a plurality of cylindrical wire brushes 16, each rotated by an individual motor 17, and arranged in a sequence of groups along the longitudinal axis of a frame 18 above a conveyor belt 19. The belt 19 is for the purpose of conveying wood products 20 (Figure 2), such as panels of plywood, from the intake end 21 of the machine to the outlet end 22, and defines a path or axis of transport for such products through the machine. The brushes 16 are for the purpose of cutting the softer portions of the wood surface from the harder portions thereof by scouring action, and for polishing and buffing the remaining harder portions.

The groups into which the brushes 16 are divided extend transversely of the frame 18 and may contain any convenient number of brushes, but preferably an even number, such as the four brushes to each group illustrated in Figure 1. The brushes of each group are preferably parallel to each other and are, by groups, disposed with their axes of rotation inclined at an oblique angle to the axis of transport defined by the belt 19. We have illustrated by way of example a machine having six transverse groups of brushes, which for convenient reference in describing the operation of the machine we have numbered 25 to 30, inclusive, consecutively from the intake end 21 to the outlet end 22. More or fewer groups of brushes may be utilized, but six is a convenient number in that, as hereinafter explained, it permits a complete 360° cycle, suitably subdivided, in the angular relation of the brushes to the work and leaves the group 30 available for polishing the work.

The angle at which the brushes 16 are set with respect to the axis of transport may also vary. As herein shown, the angle at which the axes of rotation of the brushes intersect the axis of transport is about 30°. The angular incidence of the axes of rotation of the brushes of successive groups is alternately from opposite sides of the axis of transport, so that measuring continuously and clockwise from a reference line originating at a particular group of brushes and extending parallel to the axis of transport toward the intake end 21, the groups 25, 27, and 29 may be said to form angles of 30° with the axis of transport, and the groups 26, 28, and 30 may be said to form angles of 330° with the axis of transport. Other angles may be selected, and it is not necessary that the angles throughout the sequence of groups be uniform or that the change from one side to the other of the axis of transport be by alternate groups, as the object is primarily to establish a variety of angles at which the brushes may scour the slabs of wood or panels of plywood passing through the machine.

The brushes in each group of brushes are set so as to overlap slightly, thereby providing a complete and overlapping coverage of the material which they scour.

Each of the brushes 16 is adjustably held in the frame 18 by an individual mounting, as illustrated in detail in Figures 7, 8 and 9. A support bar 32 is secured diagonally to the frame 18 and has bolted to it a flanged plate 33 with raised slideways 34 which in turn supports a carrier plate 35 so as to provide for relative vertical adjustment. The carrier plate 35 has a threaded bracket 36 which receives an adjustment screw 37 shouldered against the support bar 32. The outer slideways 34 receive the threaded ends of locking bolts 38 which are shouldered against the carrier plate 35 and extend through slots 39 therein. When the locking bolts 38 are loosened, the carrier plate 35 may be raised or lowered with respect to the flanged plate 33 and support bar 32, by turning the adjustment screw 37. Adjacent the ends of the carrier plate 35 are brackets 40 which support bearing boxes 41 in which a shaft 42 is journalled. The brush 16 is provided with an internal sleeve 43, shown in Figure 10 and slidably fitting the shaft 42 and retained thereon by pins 44 engaged in notches 45. The bristles 43 of the brushes 16 are preferably of a good grade of wire of about seven one-thousandths of an inch in diameter, although a coarser grade of wire may be used on the brushes of the first group or groups in the sequence in order to increase the roughness of the cut and better to prepare the wood surfaces for the scouring action of the later groups.

The adjustment of the individual carrier plates 35 by means of the adjustment screws 37 and the locking bolts 38 permits the brushes 16 to be individually adjusted to compensate for wear on their bristles, as well as to accommodate slabs or panels 20 of various thicknesses. It may sometimes occur that the bristles on one end of a brush will wear faster than the bristles at the other end, in which event the brush may be easily removed and reversed on the shaft 42 by removing the pins 44 and pulling the shaft through the bearing boxes 41.

The shafts 42 each carry at one end a V-belt pulley 48. To relieve the adjustment screw 37 and locking bolts 38 of the torsional strain imposed on them by power applied at the end of a shaft 42, the carrier plate 35 has a key rib 49 which slides in a keyway 50 in the flanged plate 33. The key 49 and keyway 50 and the surfaces of the slideways 34 are the only bearing surfaces between the flanged plate 33 and the carrier plate 35, Friction to be overcome in making adjustments is thereby reduced.

Figure 4:
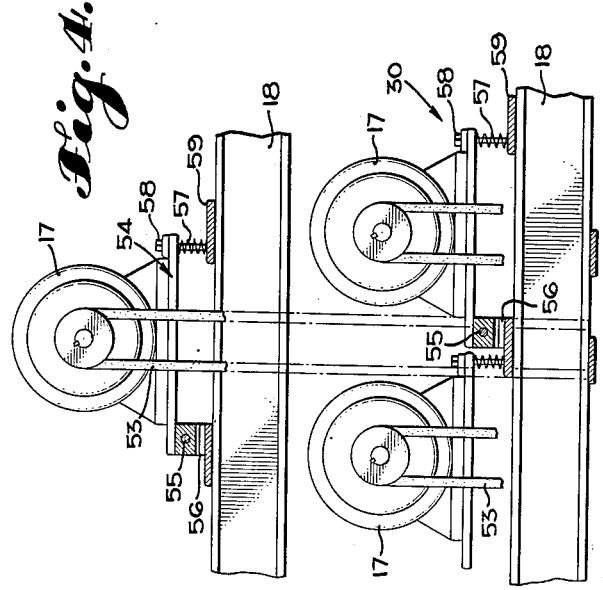
Figure 4 is an end view, partly in section, of the motor group shown in Figure 3, the direction of view and line of section being indicated by the line 4—4 of Figure 3.

As heretofore stated, each of the brushes 16 is rotated by its individual motor 17, connected therewith by V-belts 53. The motors 17 are staggered vertically to allow for the fact that they are normally of greater diameter than the brushes 16 and yet should desirably be disposed directly above their respective brushes. They are secured to the frame 18 parallel to and above their respective brushes by floating mountings 54, shown in Figures 3 and 4. One end of the mounting 54 has trunnions 55 pivoted in brackets 56, and the opposite end of the mounting is supported on compression springs 57. Bolts 58, threaded in supporting members 59 of the frame 18 regulate the tension which the springs 57 may impose on the belts 53.

The motors 17 are preferably of the reversible type and are controlled by conventional reversing switch mechanism so that they may drive their respective brushes 16 in either rotative direction. The reversibility of the motors doubles the number of angles at which the bristles 46 may impinge upon the slabs or panels 20. For example, with the brushes 16 of the group 25 set to have their axes of rotation intersect the axis of transport at an angle of 30°, the bristles 46 of these brushes may be caused to impinge upon the panels at angles of either 120° or 300° with the axis of transport. Similarly, the bristles of the subsequent group 26, in which the axes of rotation of the brushes are at 330° to the axis of transport, may be caused to impinge upon the panels at angles of either 60° or 240°.

Figure 5:
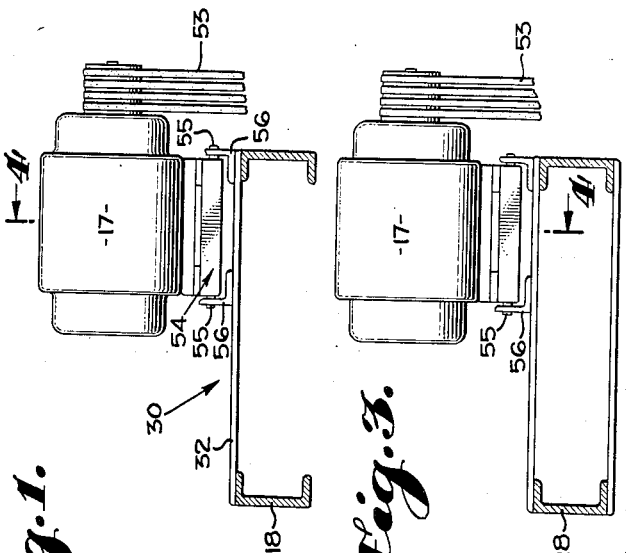
Figure 5 is a fragmentary sectional view illustrating the conveyor drive, the plane of section being taken on the line 5—5 of Figure 1, with the direction of view as indicated.
Figure 11:
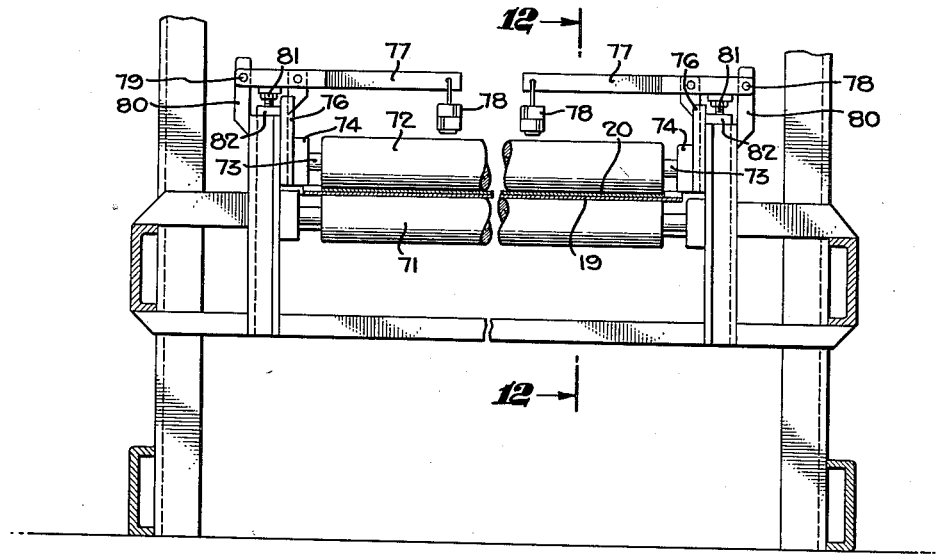
Figure 11 is an enlarged vertical sectional view taken on the line 11—11 of Figure 2, with the direction of view as indicated and showing a typical unit of the roller system used to guide material through the machine.
Figure 12:
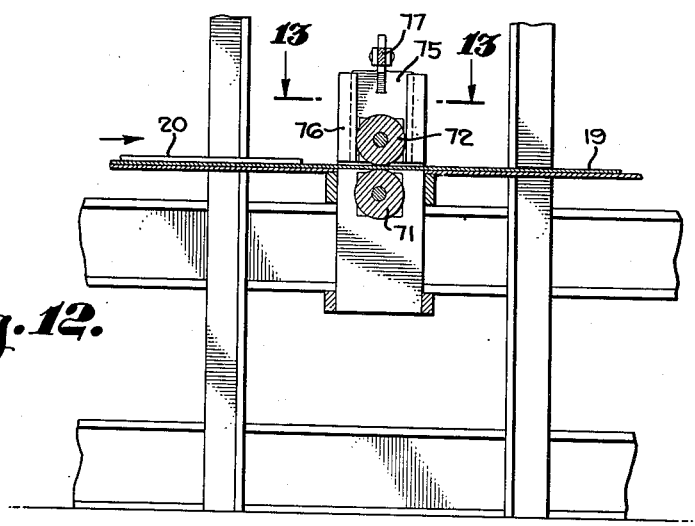
Figure 12 is a vertical sectional view taken on the line 12—12 of Figure 11, with the direction of view as indicated.
Figure 13:
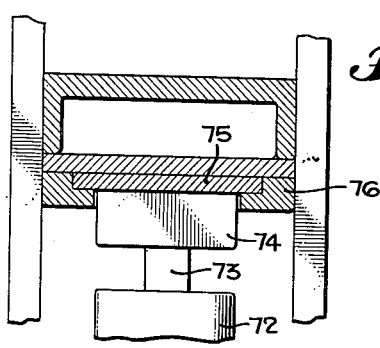
Figure 13 is a further enlarged horizontal sectional view taken on the line 13—13 of Figure 12, showing details of an adjustable bearing for the roller system.

The mechanism for transporting the slabs or panels 20 through the machine is shown in detail in Figures 5 and 6 and in Figures 11 to 13. The conveyor belt 19 passes around a drum 62 at the outlet end 22 of the machine and thence around a take-up idler pulley 63 before returning to a pulley 64 at the intake end 21. The drum 62 is driven from a variable speed mechanism 65, in turn driven by V-belts 66 from a suitable source of power, not shown.

As the conveyor belt 19 traverses the machine in the direction of transport of material to be treated, it passes between rollers which support it and hold the material in place upon it. The rollers are arranged in vertically related pairs, the lower rollers 71 being axially fixed in relation to the frame 18 and the upper rollers 72 being adjustable vertically to accommodate slabs or panels 20 of various thicknesses. The journals 73 of the upper rollers 72 rotate in journal boxes 74 secured to slide bars 75 sliding in guides 76. The upper ends of the slide bars 75 are pivotally secured to lever arms 77 which are weighted with weights 78. The lever arms 77 have their fulcrums 79 in brackets 80 secured to the frame 18. Adjustment screws 81 threaded in frame members 82 have their heads bearing against and supporting the lever arms 77 and thereby regulate the lowest positions which the lever arms, the attached slide bars 75, and the journals 73 may assume.

In the operation of the machine, we prefer to control the motors 17 so that in each group of brushes 16 the brushes disposed mainly on one side of the center line of the conveyor belt 19 rotate in one direction and the brushes disposed mainly on the other side of the center line of the belt rotate in the opposite direction. As the brushes are disposed to overlap slightly, it will be understood that there will be rapidly consecutive impingement of the bristles 46 in two directions upon the portion of a panel 20 immediately adjacent to the center line of the machine, but that broadly speaking, the surfaces of the panel lying to the right and left of the center line will be scoured at different angles. We also prefer to alter the direction of rotation of the brushes 16 by groups, so that no two consecutively aligned brushes impinge on the panel surfaces at the same angle.

Thus, for example, the brushes lying to the right of the center line or axis of transport of the machine may rotate clockwise in group 25, as viewed from the intake end of the machine, the aligned brushes of group 26 may rotate counter-clockwise, the aligned brushes of group 27 may also rotate counter-clockwise, the aligned brushes of groups 28 and 29 may both rotate clockwise, and the aligned brushes of group 30 may rotate counter-clockwise.

The brushes disposed to the left of the axis of transport of the machine would then rotate counter-clockwise in group 25, clockwise in groups 26 and 27, counter-clockwise in groups 28 and 29, and clockwise in group 30. Due to the difference in angle at which succeeding groups are disposed relatively to the axis of transport, every portion of the surface of each panel 20 would be scoured at at least four angles differing for consecutive groups. As herein illustrated and above described by way of example, the right and left hand brushes of group 25 would impinge on the panel surfaces at angles of 300° and 120° respectively; the aligned brushes of group 26 would impinge at angles of 60° and 240°; the aligned brushes of group 27 would impinge at 120° and 300°; and the aligned brushes of group 28 would impinge at 240° and 60°. The brushes of groups 29 and 30 would repeat the angular incidence of the brushes of groups 25 and 26.

The advantages of such an arrangement of angles of impingement relate both to ease of operation and to quality of the product. As the brushes of any particular group of brushes impinge on a panel at angles 180° apart, the pushing forces imparted to a panel by any group are substantially equalized and offset, and do not tend to twist the panel or to move it laterally or to impede its progress through the machine. An eight foot plywood panel may be acted upon by several groups of brushes at a given instant, or by only one or two groups as it enters or leaves the machine, with no tendency to deviate from the established axis of transport although each brush individually impinges on it at an angle oblique to that axis.

The variety of angles of impingement, all of them oblique to the axis of transport, results in a superior product. The grain of the surface plies of a plywood panel are usually aligned with the rectangular axes of the panel, and when the panel is fed into the machine in the normal manner with a rectangular axis parallel to the axis of transport, the impingement of the bristles is oblique to the grain of the wood surface. Each successive group of brushes removes a little more of the softer surface material, leaving the harder portions of the grain outstanding in relief. If the bristles impinged in directions parallel to or normal to the grain, they would fail to scour the softer material from the corners and curves usual in wood grains and from the bases of the harder ridges. The oblique incidence of the bristles permits them to push their points into corners and particularly into hollows at the base of hard ridges and so thoroughly to remove the softer material as to leave the harder material in "sharp," rather than in blurred, relief. The multiplicity of oblique angles of impingement gives assurance that, for practical purposes, all portions of the wood surface are adequately treated.

The height of the brushes 16 above the panels 20 may be altered by adjusting the carrier plates 35 so as to vary the effect of successive groups of brushes. The groups may be adjusted so that they scour progressively to a greater depth, thus saving undue wear on the initial groups in achieving a desired effect and increasing the average efficiency of all of the groups. Of course, the groups may also be raised or lowered uniformly to accommodate panels of greater or lesser thickness.

The advantage of being able to adjust the elevation of the brushes of one group in relation to the brushes of other groups is particularly apparent in the case of the last group of the sequence. It is often desirable to treat fine wood surfaces so that the residual hard grained portions are not only raised in relief, but are highly polished. This may be accomplished by setting the brushes of the last group, 30, so close to the panel 20 that the bristles 46 are bent by contact with the panel. The bristles then do not cut into the wood with their points, but rather, sweep the wood surfaces with the sides of their tips and so burnish and polish the wood surfaces, providing a beautiful finish.

The ability to reverse the motors 17 is of advantage in maintaining the general efficiency of the machine, as well as in forming various angle patterns. After the machine has been in operation for a period of time, the bristles 46 are apt to assume a set or inclination other than radial to the brush shafts 42, and they then lose efficiency. By reversing all the motors simultaneously, the same angle pattern is maintained, except that right and left inclinations are reversed, and the points of the bristles are again presented to the wood surfaces in a manner efficient for cutting and scouring.

We claim:

1. In a machine for treating wood surfaces: conveyor means defining a path for the transport of material to be treated; a plurality of rotatable brushes adapted to remove by scouring the softer portions of said surfaces and arranged in transverse groups disposed consecutively along said path, the brushes of each group having parallel axes of rotation, and the unit groups having their constituent parallel axes of rotation at a variety of angles with respect to the axis of said path; and means for rotating said brushes.

2. In a machine for treating wood surfaces: conveyor means defining a path for the transport of material to be treated; a plurality of rotatable brushes adapted to remove by scouring the softer portions of said surfaces and arranged in sequence along said path, each brush having its axis of rotation at an oblique angle to the axis of said path and at an angle to the axis of rotation of sequentially adjacent brushes; and means for rotating said brushes.

3. In a machine for treating wood surfaces: conveyor means defining a path for the transport of material to be treated; a plurality of rotatable brushes adapted to remove by scouring the softer portions of said surfaces and arranged in groups disposed consecutively along said path, each of said groups extending transversely across said path and having its individual brushes substantially aligned with individual corresponding brushes of adjacent groups, said brushes having their axes of rotation at oblique angles to the axis of said path and the brushes of succeeding groups having their axes of rotation disposed angularly with respect to the axes of rotation of the immediately preceding aligned brushes; and means for rotating said brushes.

4. In a machine for treating wood surfaces: conveyor means defining a path for the transport of material to be treated; a plurality of rotatable brushes arranged in consecutive groups along said path, having bristles adapted to remove by scouring the softer portions of said surfaces, the axes of rotation of the brushes comprised in each group being substantially parallel and being inclined to the axis of said path at an oblique angle, the angular incidence of the axes of rotation of successive groups being alternately from opposite sides of said axis of said path; and means for rotating said brushes.

5. In a machine for treating wood surfaces so as to produce a raised grain thereon: conveyor means defining a path for the transport of wooden units to be surface-treated and adapted to hold said units so that the surface grain of said units has a normal fixed direction relative to said path; and a plurality of rotatable brushes arranged contiguous to said path, having bristles adapted to remove by scouring the softer portions of said surfaces and having their axes of rotation at a plurality of different oblique angles with respect to the normal direction of said surface grain.

6. In a machine for treating wood surfaces, including means defining an axis of alignment of materials to be treated: a plurality of rotatable brushes having bristles adapted to scour said surfaces, said brushes being arranged in sequence parallel to said axis of alignment, and having their axes of rotation at various oblique angles to said axis of alignment; and means for rotating some of said brushes in the opposite direction, whereby the bristles of said brushes are caused to impinge upon said surfaces at a variety of angles oblique to said axis of alignment.

7. In a machine for treating wood surfaces, including means defining an axis of alignment of materials to be treated: a plurality of rotatable brushes having bristles adapted to scour said surfaces, said brushes being arranged in sequence parallel to said axis of alignment, and means for rotating said brushes, said brushes having their axes of rotation at various oblique angles with respect to said axis of alignment whereby the bristles of said brushes are caused to impinge upon said surfaces at a variety of angles oblique to said axis of alignment, said means for rotating being reversible to reverse the direction of impingement of said bristles upon said surfaces.

8. In a machine for treating wood surfaces, including means defining an axis of alignment of materials to be treated: a plurality of rotatable wire brushes arranged in a sequence parallel to said axis of alignment and so disposed and so rotated as to sweep said surface at a variety of angles, the initial brushes of said sequence having such bristle hardness as to be capable of removing the softer portions of said surfaces by cutting and scouring, and the terminal brush of said sequence being mounted with its axis of rotation spaced from said surface by a distance substantially less than the length of said bristles measured from their said axis of rotation whereby said bristles of said terminal brush are bent by contact with said surfaces so as to polish said surfaces without materially cutting the same.

9. In a machine for treating wood surfaces: conveyor means defining a path for the transport of material to be treated; a plurality of rotatable brushes adapted to remove by scouring the softer portions of said surfaces and arranged in sequence along said path, each brush having its axis of rotation at an oblique angle to the axis of said path and at an angle to the axis of rotation of sequentially adjacent brushes; said brushes being so arranged vertically as to progressively scour said surfaces to an increasing depth; the last brush of said sequence being mounted with its axis of rotation spaced from said surface by a distance substantially less than the length of said bristles measured from their said axis of rotation whereby the bristles thereof are caused to bend when in contact with said surfaces and to sweep said surfaces with lateral portions of their tips in a polishing rather than a cutting action, and means for rotating said brushes.

10. In a machine for treating wood surfaces, conveyor means defining a path for the transport of material to be treated in a predetermined direction, a plurality of brushes mounted for rotation about axes adjacent said path in position for the bristles of said brushes to impinge against the surface of said material on said conveyor means, said brushes being disposed with their several axes of rotation at a variety of angles with respect to said direction of movement of said material, and means for rotating said brushes.

11. In a machine for treating wood surfaces, conveyor means defining a path for the transport of material to be treated in a predetermined direction, a plurality of brushes mounted for rotation about axes adjacent said path in position for the bristles of said brushes to impinge against the surface of said material on said conveyor means, said brushes being disposed with their several axes of rotation at a variety of angles with respect to said direction of movement of said material, means for rotating some of said brushes in one direction, and means for rotating others of said brushes in the opposite direction.

CLIFFORD T. McELROY.
JOHN G. DAVIDSON.

REFERENCES CITED

The following references are of record in the file of this patent:

UNITED STATES PATENTS

| Number | Name | Date |
|---|---|---|
| 743,911 | Muller | Nov. 10, 1903 |
| 1,853,470 | Staehle | Apr. 12, 1932 |
| 2,218,913 | Hughes | Oct. 22, 1940 |
| 2,221,348 | Hershey | Nov. 12, 1940 |
| 2,467,194 | De Witt | Apr. 12, 1949 |

FOREIGN PATENTS

| Number | Country | Date |
|---|---|---|
| 30,745 | Australia | Dec. 24, 1931 |